United States Patent
Tanabe

(10) Patent No.: US 9,469,158 B2
(45) Date of Patent: Oct. 18, 2016

(54) THIOESTER MODIFIED POLYMER, METHOD OF MANUFACTURING THE SAME AND RUBBER COMPOSITION CONTAINING THE SAME

(71) Applicant: The Yokohama Rubber Co., Ltd., Tokyo (JP)

(72) Inventor: Yasuke Tanabe, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/650,067

(22) PCT Filed: Dec. 6, 2013

(86) PCT No.: PCT/JP2013/082810
§ 371 (c)(1),
(2) Date: Jun. 5, 2015

(87) PCT Pub. No.: WO2014/088091
PCT Pub. Date: Jun. 12, 2014

(65) Prior Publication Data
US 2015/0315300 A1  Nov. 5, 2015

(30) Foreign Application Priority Data

Dec. 6, 2012 (JP) .................................. 2012-267053

(51) Int. Cl.
| | | |
|---|---|---|
| B60C 1/00 | (2006.01) | |
| C08C 19/20 | (2006.01) | |
| C08K 5/54 | (2006.01) | |
| C08L 9/00 | (2006.01) | |
| C08L 15/00 | (2006.01) | |

(52) U.S. Cl.
CPC ............... *B60C 1/00* (2013.01); *B60C 1/0016* (2013.04); *B60C 1/0025* (2013.04); *C08C 19/20* (2013.01); *C08K 5/54* (2013.01); *C08L 9/00* (2013.01); *C08L 15/00* (2013.01); *C08L 2205/02* (2013.01); *C08L 2205/025* (2013.01)

(58) Field of Classification Search
CPC ..... B60C 1/00; B60C 1/0016; B60C 1/0025; C08C 19/20; C08K 5/54; C08L 9/00; C08L 15/00; C08L 2205/025; C08L 2205/02
See application file for complete search history.

(56) References Cited

U.S. PATENT DOCUMENTS

| | | | |
|---|---|---|---|
| 3,551,394 A | | 12/1970 | Sakuragi et al. |
| 4,877,863 A | * | 10/1989 | Lanza et al. ............... C08F 6/02 524/575 |
| 5,248,735 A | | 9/1993 | Knipp et al. |
| 5,252,652 A | * | 10/1993 | Egashira et al. ... A63B 37/0003 473/372 |
| 5,710,211 A | | 1/1998 | Sato et al. |
| 2009/0215963 A1 | | 8/2009 | Coiai et al. |
| 2012/0264898 A1 | | 10/2012 | Inoue et al. |

FOREIGN PATENT DOCUMENTS

| | | |
|---|---|---|
| JP | 50-10917 | 4/1975 |
| JP | 62-184036 | 8/1987 |
| JP | 4-227734 | 8/1992 |
| JP | 09-003108 | 1/1997 |
| JP | 9-100320 | 4/1997 |
| JP | 10-251222 | 9/1998 |
| JP | 2008-163239 | 7/2008 |
| JP | 2009-269981 A | 11/2009 |
| JP | 2012-219237 A | 11/2012 |

OTHER PUBLICATIONS

International Preliminary Patentability Report and Written Opinion from corresponding PCT application No. PCT/JP2013/082810 dated Jun. 18, 2015 (6 pgs).
International Search Report from corresponding PCT application No. PCT/JP2013/082810 dated Feb. 4, 2014 (4 pgs).

* cited by examiner

*Primary Examiner* — Nathan M Nutter
(74) *Attorney, Agent, or Firm* — Brinks Gilson & Lione

(57) ABSTRACT

Provided is a thioester modified polymer, wherein a polymer having an intramolecular double bond is modified with at least one of thiocarboxylic acid and dithiocarboxylic acid. The above thioester modified polymer can be manufactured by allowing a polymer having an intramolecular double bond to react with thiocarboxylic acid, dithiocarboxylic acid or a metal salt thereof, and used to be compounded in a diene-based rubber. When this thioester modified polymer is compounded in a diene-based rubber, in particular a silica containing diene-based rubber, tensile strength and breaking elongation, in particular tensile strength and breaking elongation at a high temperature (100° C.), can be improved without decreasing modulus, hardness, exothermicity and the like. Therefore, the rubber composition having excellent thermal resistance and toughness can be effectively used as a rubber compound for forming a cap tread or a side tread of a pneumatic tire.

12 Claims, No Drawings

THIOESTER MODIFIED POLYMER, METHOD OF MANUFACTURING THE SAME AND RUBBER COMPOSITION CONTAINING THE SAME

RELATED APPLICATION

This application is a 35 U.S.C. §371 national phase filing of International Patent Application No. PCT/JP2013/082810, filed Dec. 6, 2013, through which and to which priority is claimed under 35 U.S.C. §119 to Japanese Patent Application No. 2012-267053, filed Dec. 6, 2012, the complete disclosure of which is hereby expressly incorporated by reference.

TECHNICAL FIELD

The present invention relates to a thioester modified polymer, a method of manufacturing the thioester modified polymer and a rubber composition containing the thioester modified polymer. More particularly, the present invention relates to a thioester modified polymer in which a polymer having an intramolecular double bond is modified, a method of manufacturing the thioester modified polymer and a rubber composition containing the thioester modified polymer.

BACKGROUND ART

Patent Document 1 describes a chelate-introduced macromolecule obtained by allowing a maleic anhydride-graft modified polymer to react with a chelate ligand of a polyphosphoric acid having a hydroxyl group or an amino group, an amino polycarboxylic acid or 1,3-diketone to further introduce these functional groups into the maleic anhydride group. Patent Document 1 also describes that a rubber such as EPR, BR and IR may be used as a polymer to be graft modified, and the chelate structure can reliably bind with a thioester bond and the like. However, the chelate structure is formed through the maleic anhydride grafted into a polymer.

PRIOR ART DOCUMENTS

Patent Literature

Patent Document 1: Japanese Patent No. 4965245
Patent Document 2: Japanese Patent Application Laid-Open No. 2012-219237

SUMMARY OF THE INVENTION

Problem to be Solved by the Invention

An object of the present invention is to provide a thioester modified polymer in which a polymer having an intramolecular double bond is directly modified, a method of manufacturing the thioester modified polymer and a rubber composition containing the thioester modified polymer.

Means for Solving the Problem

The present invention provides a thioester modified polymer in which a polymer having an intramolecular double bond is modified with at least one type of thiocarboxylic acid and dithiocarboxylic acid. The above thioester modified polymer is manufactured by allowing a polymer having an intramolecular double bond to react with thiocarboxylic acid, dithiocarboxylic acid or a metal salt thereof, and the resulting modified polymer may be used to be compounded in a diene-based rubber.

Effect of the Invention

In the case of the thioester modified polymer according to the present invention, a thiocarboxylic acid group or a dithiocarboxylic acid group, which is a modifying group, can be directly introduced into a polymer having an intramolecular double bond by the ene-thiol reaction without specific need of a radical initiator, a light source, a heat source, an inert atmosphere and the like. The modified polymer obtained by such a simple method has excellent storage stability, thermal stability, acid resistance, oxidation resistance and the like since it has a thermally stable thioester group, as compared with a thiol group as a common sulfur-containing functional group (see Patent Document 2). When this thioester modified polymer is compounded in a diene-based rubber, in particular a silica containing diene-based rubber, tensile strength and breaking elongation, in particular tensile strength and breaking elongation at a high temperature (100° C.) can be improved without decreasing modulus, hardness, exothermicity and the like. Therefore, the rubber composition having excellent thermal resistance and toughness is effectively used as a rubber compound for forming a cap tread and a side tread of a pneumatic tire.

EMBODIMENTS FOR CARRYING OUT THE INVENTION

The polymer having an intramolecular double bond is a polymer that has a double bond at least one position in a main chain, side chain and terminus thereof. As the above polymer, used are liquid or solid polyisoprene rubber, polybutadiene rubber, styrene-butadiene rubber, butyl rubber (isobutylene-isoprene rubber), EPDM and the like. Styrene-butadiene rubber may be E-SBR (emulsion-polymerized SBR) or S-SBR (solution-polymerized SBR). Further, butadiene rubber may be high cis-polybutadiene, and the terminal double bonds may or may not be modified. As the polymer having a double bond at a terminus, a polymer having a double bond at one or both termini may be used. Modifying components contained in a main chain or side chain include polyalkylene, polyester, polyether, polyamide and the like.

Thiocarboxylic acid or dithiocarboxylic acid used as a modifying agent has a —COSH group or a CSSH group, and is an aliphatic or aromatic thiocarboxylic acid or dithiocarboxylic acid, including, for example, thioacetic acid, thiopropionic acid, thiobutyric acid, thiovaleric acid, thiobenzoic acid, dithioacetic acid and the like. Preferably, the following substances are used:

thiobenzoic acid $C_6H_5COSH$ or $C_6H_5CSOH$ thioacetic acid $CH_3CSOH \rightleftharpoons CH_3COSH$ dithioacetic acid $CH_3CSSH$ The above thiocarboxylic acid or dithiocarboxylic acid may be used for a reaction in a form of a metal salt thereof, preferably a sodium salt, a potassium salt, or a lithium salt. In a case where thiocarboxylic acid or dithiocarboxylic acid is used as a metal salt for a reaction, it is preferably used for the reaction in the presence of protonic acid, for example, hydrochloric acid, sulfuric acid, phosphoric acid and a salt thereof, ammonium chloride, etc., in a stoichiometry amount or more.

The reaction of the polymer having an intramolecular double bond with thiocarboxylic acid, dithiocarboxylic acid or a metal salt thereof is performed by stirring for about 5 minutes to 20 hours under the conditions of about 0 to 100° C., generally at room temperature in the presence of an organic solvent, for example, toluene, n-hexane, tetrahydrofuran and the like, or in the presence of an aqueous medium. Further, in the case of a liquid polymer, the reaction can be performed in the absence of either an organic solvent or an aqueous medium. Even in the case of a solid polymer, the reaction can be performed by mixing in a mixer using a mixing device and the like.

The reaction between these can be performed under mild conditions as described above. A thiocarboxylic acid group or a dithiocarboxylic acid group is introduced into a double bond portion of a polymer by an ene-thiol reaction to form a thioester group. The amount of a thiocarboxylic acid group or a dithiocarboxylic acid group to be introduced varies depending on the required degree of modification, but it is generally about 1 to 300 mg, preferably about 3 to 150 mg, per 1 g polymer. Further, 90% or more of thiocarboxylic acid (a salt thereof) or dithiocarboxylic acid (a salt thereof) used for the reaction will be consumed in a modification reaction of a liquid polymer. Moreover, 50% or more will be consumed in a reaction of a solid polymer.

The resulting thioester modified polymer is compounded in a diene-based rubber, in particular, a silica containing diene-based rubber. The thioester modified polymer is used at a rate of 0.1 to 30 parts by mass, preferably 1 to 10 parts by mass, relative to the total amount of 100 parts by mass including a diene-based rubber. In a case where the ratio of the thioester modified polymer used is at less than this rate, desired modification effects cannot be obtained. On the other hand, in a case where it is used at more than this rate, processability of an unvulcanized rubber is be decreased.

As the diene-based rubber, natural rubber (NR), isoprene rubber (IR), butadiene rubber (BR), chloroprene rubber (CR), butyl rubber (IIR), nitrile rubber (NBR), styrene-butadiene rubber (SBR) and the like can be used alone or as a blended rubber, and preferably NR, BR or a blended rubber thereof can be used. As SBR, both emulsion-polymerized SBR (E-SBR) and solution-polymerized SBR (S-SBR) can be used. In particular, preferably used is the same diene-based rubber as the polymer having an intramolecular double bond used for thioester modification.

To the diene rubber composition, silica or both silica and carbon black may be added in an amount of 10 to 150 parts by mass, preferably 30 to 150 parts by mass, per 100 parts by mass of a thioester modified polymer containing diene-based rubber. The addition of these fillers, in particular silica, reduces rolling resistance and the like. Contrary to this, however, when used at more than this rate, rolling resistance and the like is deteriorated.

Used is a silica having a BET specific surface area (in accordance with ASTM D1993-03) of 70 to 200 m²/g, preferably 70 to 190 m²/g. These are a dry-process silica manufactured by pyrolysis of silicon halides or organosilicon compounds, and a wet-process silica manufactured by acid decomposition of sodium silicate and the like. The wet-process silica is preferably used in view of cost and performance. Actually, commercially available products currently on the market for use in the rubber industry can be used as they are.

In order to enhance the characteristics required for silica and the dispersibility in a diene-based rubber (silica has a poor affinity with rubber polymers, and also has a characteristic in which silica mutually forms a hydrogen bond in a rubber through a silanol group, resulting in a decreased dispersibility of silica into the rubber), a silane coupling agent may be compounded in an amount of about 1 to 20 parts by mass, preferably about 3 to 18 parts by mass, per 100 parts by mass of a thioester modified polymer containing diene-based rubber. As the silane coupling agent, the following are preferably used: bis(trialkoxysilylpropyl)sulfide, which has an alkoxysilyl group that reacts with a silanol group on the surface of silica and a sulfur chain reacting with a polymer,

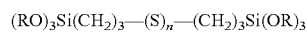

$(RO)_3Si(CH_2)_3-(S)_n-(CH_2)_3Si(OR)_3$

R: an alkyl group having 1 to 2 carbon atoms
n: an integer of 1 to 4
for example, bis(3-triethoxysilylpropyl)tetrasulfide, bis(2-triethoxysilylethyl)tetrasulfide, bis(3-trimethoxysilylpropyl)tetrasulfide, bis(3-triethoxysilylpropyl)disulfide and the like.

As the carbon black, commonly used are furnace black such as SAF, ISAF, HAF, FEF, GPF, SRF and the like. Such a carbon black, which is an effective component for forming a tread part, in particular a cap tread part, of a pneumatic tire, is used along with silica in a rate of 3 to 120 parts by mass per 100 parts by mass of a thioester modified polymer containing diene-based rubber.

Sulfur as a vulcanizing agent and any one or more of vulcanization accelerators such as thiazole-based agents (MBT, MBTS, ZnMBT and the like), sulfenamide-based agents (CBS, DCBS, BBS and the like), guanidine-based agents (DPG, DOTG, OTBG and the like), thiuram-based agents (TMTD, TMTM TBzTD, TETD, TBTD and the like), dithiocarbamate-based agents (ZTC, NaBDC and the like) and xanthate-based agents (ZnBX and the like), preferably a sulfur containing vulcanization accelerator, may be compounded in a rubber composition having each component described above as an essential component. Further, other compounding agents commonly used as compounding agents for rubber may be appropriately compounded as required, including, for example, a reinforcing agent or a filler such talc, clay, graphite and calcium silicate, a processing auxiliary agent such as stearic acid, zinc oxide, a softening agent, a plasticizer, an antioxidant and the like.

The composition may be prepared in a general way by kneading with a kneading machine or a mixer such as a kneader and a Banbury mixer, or an open roll and the like. The resulting composition is vulcanized, after being molded into a predetermined shape, at a vulcanizing temperature depending on the types of a diene-based rubber, a vulcanizing agent and a vulcanization accelerator used and a blending ratio thereof to form the tread part of a pneumatic tire and the like.

EXAMPLES

Next, the present invention will be described with reference to Examples.

Example 1

A liquid isoprene rubber (Kuraray Co., Ltd., LIR-30; Mn 28000) in an amount of 108 g and toluene in an amount of 140 ml were added to a 50 ml one-necked eggplant-shaped flask under the conditions of room temperature. Thiobenzoic acid (Tokyo Chemical Industry Co., Ltd.) in an amount of 5.40 g was added dropwise to the resulting toluene solution, and stirred for 2 hours under the conditions of room temperature. Subsequently, toluene was distilled off from the reaction mixture to quantitatively obtain thiobenzoic acid modified polyisoprene being a pale yellow liquid rubber.

$^1$H-NMR and $^{13}$C-NMR spectra of the reaction product indicated that thiobenzoic acid had disappeared, and 99% or more of the charged thiobenzoic acid had reacted with double bonds in the side chains of the liquid isoprene. Note that the symbol * indicates signals derived from a thiobenzoate group introduced into the polymer and from a proton on the carbon atom to which the thioester group is attached.

$^1$H-NMR (CDCl$_3$, 20° C.): δ=8.0 (br)*
7.6 to 7.5 (br)*
7.5 to 7.4 (br)*
7.3 (br)*
7.2 (br)*
5.2 to 5.0 (br)
4.8 to 4.6 (br)
4.0 to 3.7 (br)*
2.2 to 1.8 (br)
1.8 to 1.6 (br)
1.6 to 1.4 (br)
1.4 to 1.1 (br)
1.1 to 0.7 (br)

Example 2

A pale yellow, oil like thioacetic acid modified polyisoprene was quantitatively obtained as in Example 1 except that 2.97 g of thioacetic acid (Tokyo Chemical Industry Co., Ltd.) was used instead of thiobenzoic acid.

$^1$H-NMR and $^{13}$C-NMR spectra of the reaction product indicated that thiobenzoic acid had disappeared, and 99% or more of the charged thioacetic acid had reacted with double bonds in the side chains of the liquid polyisoprene.

$^1$H-NMR (CDCl$_3$, 20° C.): δ=5.2 to 5.0 (br)
4.8 to 4.6 (br)
3.8 to 3.5 (br)*
2.3 (s)*
2.2 to 1.8 (br)
1.8 to 1.6 (br)
1.6 to 1.4 (br)
1.4 to 1.1 (br)
1.1 to 0.8 (br)

Example 3

A pale yellow, oil like thiobenzoic acid modified polybutadiene was quantitatively obtained as in Example 1 except that the same amount (108 g) of a liquid polybutadiene rubber (Kuraray Co., Ltd., LBR-307; Mn 8000) was used as a liquid rubber, and the amount of thiobenzoic acid was changed to 5.41 g.

$^1$H-NMR and $^{13}$C-NMR spectra of the reaction product indicated that thiobenzoic acid had disappeared, and 90% or more of the charged thiobenzoic acid had reacted with double bonds in the main chains of the liquid polybutadiene.

$^1$H-NMR (CDCl$_3$, 20° C.): δ=8.3 to 8.1 (br)
7.9 (br)
7.8 (br)
7.7 to 7.3 (br)
5.9 to 5.7 (br)
5.7 to 5.3 (br)
5.1 to 4.9 (br)
3.9 to 3.7 (br)*
3.4 to 2.8 (br)*
2.3 to 2.0 (br)
2.0 to 1.2 (br)
1.2 to 0.9 (br)

Example 4

A pale yellow, oil like thioacetic acid modified polybutadiene was quantitatively obtained as in Example 3 except that 2.96 g of thioacetic acid (Tokyo Chemical Industry Co., Ltd.) was used instead of thiobenzoic acid.

$^1$H-NMR and $^{13}$C-NMR spectra of the reaction product indicated that thioacetic acid had disappeared, and 95% or more of the charged thioacetic acid had reacted with double bonds in the main chains of the liquid polybutadiene.

$^1$H-NMR (CDCl$_3$, 20° C.): δ=5.9 to 5.7 (br)
5.7 to 5.3 (br)
5.1 to 4.9 (br)
3.8 to 3.6 (br)*
3.1 to 2.7 (br)*
2.3 (br, s)*
2.3 to 2.0 (br)
2.0 to 1.2 (br)
1.2 to 0.9 (br)
0.8 to 0.6 (br)

Example 5

A white solid thiobenzoic acid modified polystyrene butadiene rubber was quantitatively obtained as in Example 1 except that the same amount (108 g) of polystyrene-butadiene rubber (Asahi Kasei Chemicals Corporation, Tufdene 1000; Mn 430000) was used instead of a liquid rubber, and the amount of thiobenzoic acid was changed to 5.41 g.

$^1$H-NMR and $^{13}$C-NMR spectra of the reaction product indicated that thiobenzoic acid had disappeared, and 60% or more of the charged thiobenzoic acid had reacted with a double bond at least one position in a main chain, side chain and chain terminus of the polystyrene-butadiene.

$^1$H-NMR (CDCl$_3$, 20° C.): δ=8.3 to 8.1 (m)
7.9 (br)
7.8 (br)
7.7 to 7.4 (m, br)
7.3 (br)
7.2 to 7.0 (br)
5.6 to 5.5 (br)
5.5 to 5.2 (br)
5.1 to 4.9 (br)
3.9 to 3.7 (br)*
2.6 to 2.5 (br)
2.3 to 2.2 (br)
2.2 to 1.8 (br)
1.8 to 1.6 (br, m)

Example 6

A white solid thioacetic acid modified polystyrene-butadiene rubber was quantitatively obtained as in Example 5 except that 5.41 g of thioacetic acid (Tokyo Chemical Industry Co., Ltd.) was used instead of thiobenzoic acid.

$^1$H-NMR and $^{13}$C-NMR spectra of the reaction product indicated that thioacetic acid had disappeared, and 60% or more of the charged thioacetic acid had reacted with a double bond at least one position in a main chain, side chain and terminus of the polystyrene-butadiene.

$^1$H-NMR (CDCl$_3$, 20° C.): δ=7.3 (br)
7.2 to 7.0 (br)
5.6 to 5.5 (br)
5.5 to 5.2 (br)
5.1 to 4.9 (br)

3.5 to 3.2 (br)*
2.6 to 2.5 (br)
2.4 (br, s)
2.3 to 2.2 (br)
2.2 to 1.8 (br)
1.8 to 1.6 (br, m)

Example 7

A pale yellow, oil like thioacetic acid modified polyisoprene was quantitatively obtained as in Example 2 except that 4.46 g (39 mmol) of potassium thioacetate (Tokyo Chemical Industry Co., Ltd.) and 2.3 g (43 mmol) of ammonium chloride (the same manufacturer as above) were used instead of thiobenzoic acid.

$^1$H-NMR and $^{13}$C-NMR spectra of the reaction product indicated that a similar product was obtained as in Example 2 in which thioacetic acid was used.

Example 8

A solid polybutadiene rubber (Zeon Corporation, NIPOL BR1200; Mn 460,000, the cis content 97% or more) in an amount of 100 g and toluene in an amount of 200 ml were added to a 1000 ml one necked, eggplant-shaped flask under the conditions of room temperature. Thiobenzoic acid (Tokyo Chemical Industry Co., Ltd.) in an amount of 5.00 g was added dropwise to the resulting toluene solution, and stirred for 2 hours under the conditions of room temperature. Subsequently, toluene was distilled off from the reaction mixture to quantitatively obtain a pale yellow, rubber like thiobenzoic acid modified polybutadiene.

$^1$H-NMR and $^{13}$C-NMR spectra of the reaction product indicated that thiobenzoic acid had disappeared, and 90% or more of the charged thiobenzoic acid had reacted with double bonds in the solid polybutadiene.

$^1$H-NMR (CDCl$_3$, 20° C.): δ=8.0 to 7.9 (br)*
7.6 to 7.5 (br)*
7.5 to 7.3 (br)*
5.7 to 5.2 (br)
5.1 to 4.9 (br)
3.9 to 3.7 (br)*
2.4 to 1.8 (br)
1.8 to 1.2 (br)

Comparative Example

| | |
|---|---|
| SBR (emulsion polymerization SBR; Zeon Corporation, NIPOL 1502) | 70 parts by mass |
| BR (Zeon Corporation, NIPOL BR1220) | 30 parts by mass |
| Silica (Nippon Silica Industry Co., Ltd., Nipsil AQ) | 50 parts by mass |
| Silane coupling agent (Evonik Degussa, Si69) | 4 parts by mass |
| Carbon black (Showa Cabot K. K., Showblack N339M) | 5 parts by mass |
| Zinc oxide (Seido Chemical Industry Co., Ltd., Zinc White No. 3) | 3 parts by mass |
| Stearic acid (NOF Corporation) | 1 part by mass |
| Antioxidant (Sumitomo Chemical Co., Ltd., Antigen 6C) | 1 part by mass |
| Oil (Japan Shell Sekiyu K. K., Extract No. 4S) | 6 parts by mass |
| Sulfur (Karuizawa Refinery, oil treated sulfur) | 2 parts by mass |
| S containing vulcanization accelerator (Sanshin Chemical Industry Co., Ltd., Sanceler CM-PO) | 1 part by mass |

The above components excluding sulfur and the vulcanization accelerator were kneaded with a 1.7 L closed Banbury mixer for 5 minutes, and then dumped out of the mixer, and cooled to room temperature. To this, sulfur and the vulcanization accelerator were added, and then kneaded with an open roll to obtain a rubber composition.

This rubber composition was press vulcanized in a given metal mold at 160° C. for 20 minutes to prepare a test piece. This test piece was measured for the following properties. Note that the rubber composition was measured for Mooney viscosity and scorch time.

Mooney viscosity: in accordance with JIS K6300
    An L-type rotor was used to measure a value of Mooney viscosity
    $ML_{1+4}$ at 100° C.
    A smaller index is better
Scorch time: in accordance with JIS K6300
    A time (minute) for a viscosity to increase by 5 points at 125° C. was measured
    A larger index means better processability
Hardness: a cylindrical vulcanized rubber sample with a diameter of 29 mm and a thickness of 12.5 mm was prepared in accordance with JIS K6255, and Lubke JIS hardness was measured under the conditions of 20° C. in accordance with JIS K6253
    A larger index is better
Tensile stress, breaking elongation: in accordance with JIS K6251
    Measured at room temperature and 100° C.
    A larger index is better
tan δ: measured using an Iwamoto Seisakusho viscoelastic spectrometer under the conditions of a strain coefficient due to elongation deformation of 10±2%, a frequency of 20 Hz, and temperatures of 0° C. and 60° C.
    A larger index of tan δ (0° C.) means superior wet grip performance
    A smaller index of tan δ (60° C.) means lower exothermicity Examples 9 to 13

Products were obtained as in Comparative Example except that a part of 30 parts by mass of BR was replaced with the thiobenzoic acid modified polybutadiene (a modified BR) obtained in Example 8. The measurement results obtained are shown in the following table along with the compounding amounts of BR and the modified BR. A measured value is shown as an index in which a value obtained from Comparative Example is taken as 100.

TABLE

| | Comparative Example | Example | | | | |
|---|---|---|---|---|---|---|
| | | 9 | 10 | 11 | 12 | 13 |
| [Compounding amount (parts by mass)] | | | | | | |
| BR | 30 | 29.9 | 29 | 25 | 20 | — |
| Modified BR | — | 0.1 | 1 | 5 | 10 | 30 |
| [Measured value] | | | | | | |
| Mooney viscosity | 100 | 101 | 100 | 101 | 100 | 101 |
| Scorch time | 100 | 100 | 99 | 98 | 94 | 91 |
| Hardness | 100 | 99 | 101 | 99 | 100 | 99 |
| M100 (20° C.) | 100 | 97 | 98 | 100 | 101 | 100 |
| M100 (100° C.) | 100 | 99 | 100 | 99 | 102 | 103 |
| Tensile strength (20° C.) | 100 | 101 | 104 | 106 | 108 | 110 |

TABLE-continued

| | Comparative Example | Example | | | | |
|---|---|---|---|---|---|---|
| | | 9 | 10 | 11 | 12 | 13 |
| Tensile strength (100° C.) | 100 | 102 | 106 | 108 | 110 | 112 |
| Breaking elongation (20° C.) | 100 | 101 | 103 | 107 | 107 | 112 |
| Breaking elongation (100° C.) | 100 | 102 | 103 | 106 | 107 | 109 |
| tan δ (0° C.) | 100 | 98 | 97 | 98 | 97 | 96 |
| tan δ (60° C.) | 100 | 100 | 98 | 100 | 98 | 100 |

The invention claimed is:

1. A thioester modified polymer, wherein a liquid or solid polyisoprene, polybutadiene, polystyrene-butadiene, butyl rubber, EPDM or natural rubber is modified only with thioester groups using thiocarboxylic acid.

2. The thioester modified polymer according to claim 1, wherein the thiocarboxylic acid is thiobenzoic acid or thioacetic acid.

3. The thioester modified polymer according to claim 1, wherein the polymer having an intramolecular double bond is a liquid or solid polymer having a double bond at least one position in a main chain, a side chain and a terminus thereof.

4. A diene-based rubber composition, wherein the thioester modified polymer according to claim 1 is compounded in a diene-based rubber.

5. The diene-based rubber composition according to claim 4, wherein 0.1 to 30 parts by mass of the thioester modified polymer is compounded in the total amount of 100 parts by mass of the diene-based rubber and the thioester modified polymer.

6. The diene-based rubber composition according to claim 5, wherein 10 to 150 parts by mass of silica and 1 to 20 parts by mass of a silane-based coupling agent are further compounded.

7. The diene-based rubber composition according to claim 4, used for forming a cap tread and/or a side tread of a pneumatic tire.

8. A pneumatic tire having a cap tread part and/or a side tread part formed with the diene-based rubber composition according to claim 7.

9. The diene-based rubber composition according to claim 5, used for forming a cap tread and/or a side tread of a pneumatic tire.

10. The diene-based rubber composition according to claim 6, used for forming a cap tread and/or a side tread of a pneumatic tire.

11. A pneumatic tire having a cap tread part and/or a side tread part formed with the diene-based rubber composition according to claim 9.

12. A pneumatic tire having a cap tread part and/or a side tread part formed with the diene-based rubber composition according to claim 10.

* * * * *